US011893205B2

(12) United States Patent
Kile, Jr. et al.

(10) Patent No.: US 11,893,205 B2
(45) Date of Patent: Feb. 6, 2024

(54) REAL-TIME GESTURES IN SHARED ELECTRONIC CANVASES

(71) Applicant: Microsoft Technology Licensing, LLC, Redmond, WA (US)

(72) Inventors: Nathan Darrel Kile, Jr., Mercer Island, WA (US); Jaewon Hwang, Kirkland, WA (US); Nicolas Gunnar Alexander Nuzzaci, Bellevue, WA (US); David Adam Stephens, Seattle, WA (US); Kyle David Ryan, Sammamish, WA (US); Maria Montserrat Lozano Dieck, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 104 days.

(21) Appl. No.: 17/560,716

(22) Filed: Dec. 23, 2021

(65) Prior Publication Data

US 2023/0135704 A1 May 4, 2023

Related U.S. Application Data

(60) Provisional application No. 63/274,225, filed on Nov. 1, 2021.

(51) Int. Cl.
*G06F 3/04812* (2022.01)
*G06F 3/01* (2006.01)
(Continued)

(52) U.S. Cl.
CPC .......... *G06F 3/04812* (2013.01); *G06F 3/017* (2013.01); *G06F 3/038* (2013.01); *G06F 3/04817* (2013.01); *G06F 3/04883* (2013.01)

(58) Field of Classification Search
CPC ...... G06F 3/04812; G06F 3/017; G06F 3/038; G06F 3/04817; G06F 3/04883; G06F 3/04845
See application file for complete search history.

(56) References Cited

U.S. PATENT DOCUMENTS

| 9,383,894 B2 * | 7/2016 | Schwesinger ........... G06F 3/017 |
| 2014/0281872 A1 * | 9/2014 | Glover .................. G06F 40/197 715/229 |

(Continued)

OTHER PUBLICATIONS

Brockschmidt, Kraig, "Programming Windows 8 Apps with HTML, CSS, and JavaScript", In Proceedings of Microsoft Press, Oct. 26, 2012, 415 Pages.

(Continued)

*Primary Examiner* — Jonathan A Boyd

(57) ABSTRACT

In non-limiting examples of the present disclosure, systems, methods and devices for enabling real-time gestures on shared canvases are presented. A shared object service may be associated with a plurality of shared objects. A plurality of user accounts and/or client devices may be granted access to a shared object. Each client device that accesses the shared object may store a distributed data structure locally that corresponds to the shared object. When client devices perform operations associated with the shared object the operations are logged by the shared object service and timestamped. Those operations are then reported to the client devices, where cursor movements can be rendered in real time. If cursor movements and/or user input device operations associated with a cursor meet conditions for a gesture operation the cursor may be transformed to a gesture/animation and rendered on canvases of each connected client device.

20 Claims, 9 Drawing Sheets

(51) Int. Cl.
*G06F 3/038* (2013.01)
*G06F 3/04883* (2022.01)
*G06F 3/04817* (2022.01)

(56) References Cited

U.S. PATENT DOCUMENTS

2020/0081555 A1 3/2020 Powderly et al.
2020/0296147 A1* 9/2020 Eliason ................ H04L 65/403
2021/0326642 A1* 10/2021 Gillian .................... H04Q 9/00

OTHER PUBLICATIONS

Jayne, et al., "Gesturing Through Cursors: Implementing Multiple Pointers in Group Support Systems", In Proceedings of the Twenty-sixth Hawaii International Conference on System Sciences, vol. 4, Jan. 5, 1993, pp. 4-12.
"International Search Report and Written Opinion Issued in PCT Application No. PCT/US22/040679", dated Dec. 8, 2022, 14 Pages.

* cited by examiner

REAL-TIME GESTURES IN SHARED ELECTRONIC CANVASES

RELATED APPLICATIONS

This application is related to and claims priority to U.S. Provisional Patent Application No. 63/274,225, filed Nov. 1, 2021, and entitled "Real-Time Gestures in Shared Electronic Canvases," which is hereby incorporated by reference in its entirety.

BACKGROUND

With the increase in remote school and work users are increasingly turning to collaborative experiences that are enabled by computing devices and network connections. Users may communicate and collaborate with one another via electronic meeting applications, chat applications, and shared documents. When using these collaborative surfaces users may sometimes be provided with point of presence indicators that provide an indication of users' positions in those surfaces, such as a cell in a spreadsheet application, a text string being edited in a document, or a message input element that indicates a user is typing. However, because of network latency issues it is difficult to provide real-time rendering of dynamic user input elements, such as cursors, to each connected client device. As such, enabling dynamic user input element interactions amongst users over remote connections is a challenge.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for enabling real-time gestures on shared canvases. A shared object service may be associated with a plurality of shared objects. A plurality of user accounts and/or client devices may be granted access to a shared object. Each client device that accesses the shared object may store a distributed data structure locally that corresponds to the shared object. When client devices perform operations associated with the shared object the operations are logged by the shared object service and time-stamped. Those operations are then reported to connected client devices, where cursor movements can be rendered in real time. If cursor movements and/or user input device operations associated with a cursor meet conditions for a gesture operation, the cursor may be transformed to a gesture/animation and rendered on canvases of each connected client device in real or near real-time. Multiple users can thus interact with one another in shared canvases via shared gesture operations that are enabled via a low latency distributed computing architecture.

According to an example, a computer-implemented method is provided. The computer-implemented method comprises: receiving an indication of a movement of a cursor on a shared canvas, wherein the movement of the cursor is initiated by a first client device accessing the shared canvas; logging the movement of the cursor as an operation in a cloud-based ledger of operations associated with the shared canvas; determining that the movement of the cursor satisfies each of one or more conditions of a gesture operation; sending data specifying the operation to a second client device accessing the shared canvas; causing, using the data specifying the operation, the second client device to render the movement of the cursor on a graphical user interface representation of a distributed data structure corresponding to the shared canvas on the second client device; and causing the second client device to transform the cursor to a user interface element corresponding to the gesture operation on the graphical user interface representation of the distributed data structure corresponding to the shared canvas on the second client device.

BRIEF DESCRIPTION OF THE DRAWINGS

Non-limiting and non-exhaustive examples are described with reference to the following figures.

DETAILED DESCRIPTION

Figure 1:
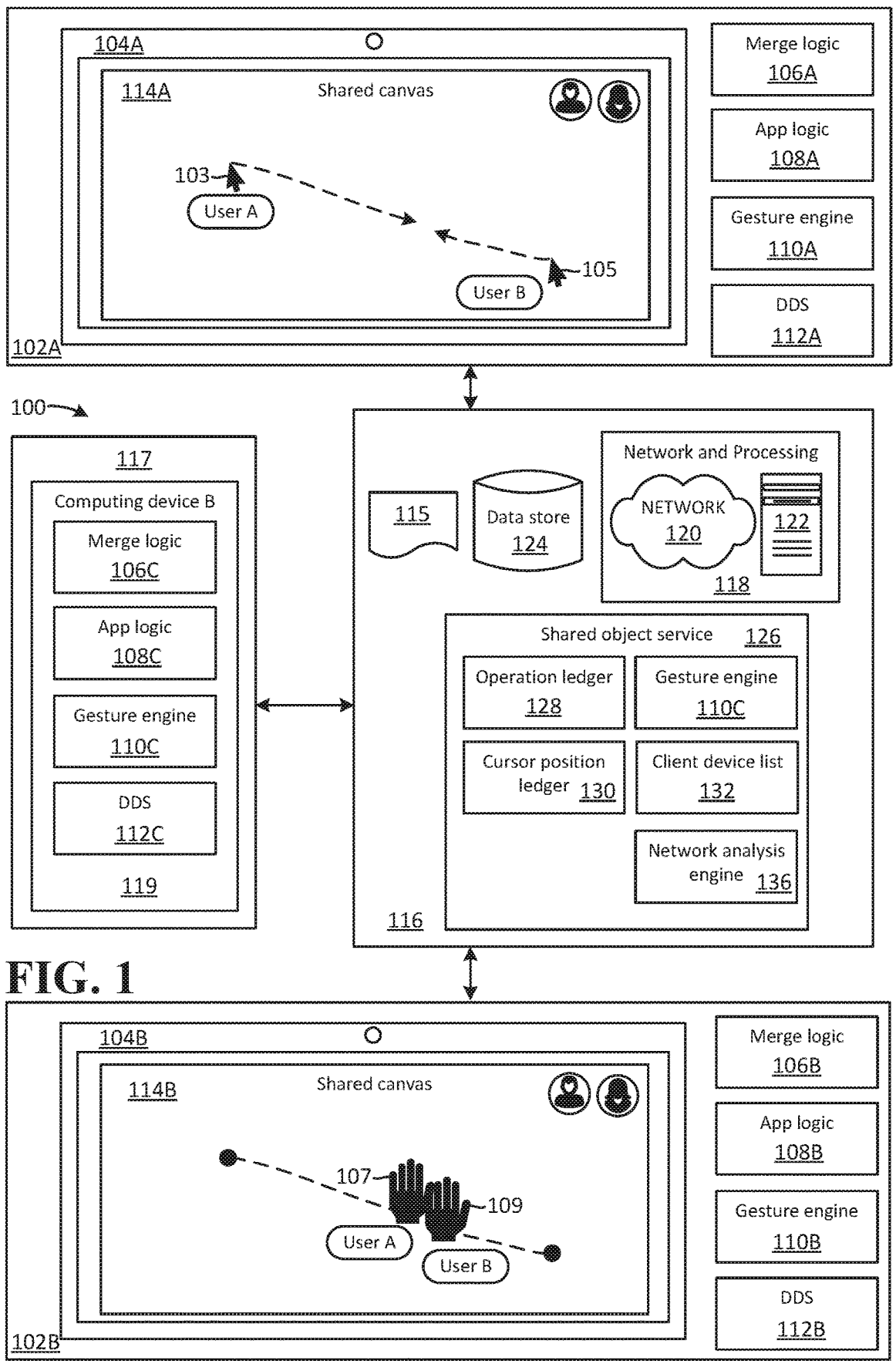
FIG. 1 is a schematic diagram illustrating an example distributed computing environment for enabling real-time gestures on shared canvases.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for enabling real-time gestures on shared canvases. A shared object service may be associated with a plurality of shared objects. The shared objects may comprise shared workspaces, shared pages, shared components, shared documents, and any combination of the same. As described herein, a shared component may comprise one or more shared text strings, one or more shared lists, one or more shared polls, one or more tables, and/or one or more images. As described herein a shared page may comprise a shared surface (e.g., a canvas, an application, a webpage) that includes one or more components. As described herein a shared workspace may comprise a shared surface (e.g., a canvas, an application, a webpage) that includes one or more shared pages. A shared workspace may include one or more organization panes and/or settings elements for navigating a workspace and modifying various elements associated with a workspace.

One or more user accounts or client computing devices may be provided with access to a shared object associated with the shared object service. Each client computing device that accesses the shared object may generate a distributed data structure corresponding to the shared object that is stored locally on the client computing device. Distributed data structures may be updated in real or near real-time as operations are reported to the local client devices that host the distributed data structures. Graphical user interfaces (GUIs) corresponding to a shared object and the distribute data structures (e.g., shared canvases) may also be updated and changes to user interface elements may be rendered in real or near real-time based on operations reported to the local client devices. In examples, the client devices and/or the shared object service may determine whether one or more conditions for a gesture/animation (e.g., handshake, handwave, fist bump, high five) are satisfied by cursor operations executed by one or more connected client devices. If a determination is made that conditions for a gesture/animation are satisfied, each client device may render the gesture/animation in real or near real-time.

To render dynamic user input elements (e.g., cursor movements, cursor transformations, gestures, animations) in real-time on distributed client devices, the shared object service works in tandem with the distributed data structures hosted on the client devices. When an operation (e.g., a cursor movement) is executed in association with a shared object on a shared canvas, the client computing device that executed that operation sends data specifying the operation to the shared object service. The shared object service writes that data to an operation ledger and/or a cursor position ledger. The shared object service also associates a timestamp with each incoming operation according to a time of execution and/or a time of operation data receipt by the shared object service. The shared object service notifies each connected client device (e.g., client devices that have a shared canvas corresponding to the shared object open) of each logged operation. Each client device then renders the cursor and/or gesture/animation operations in real or near real-time based on the operational data reported by the shared object service. The client devices may employ optimistic merge logic comprising a last-writer-wins policy. In this manner, users may interact with one another in shared canvases via dynamic user input elements, such as cursors, gestures, and animations.

The systems, methods and devices described herein provide technical advantages for facilitating real-time electronic interactions in association with shared objects. By utilizing the distributed architecture described herein, wherein individual client devices host shared canvases corresponding to shared objects and a cloud-based ledger logs cursor movement operations associated with those shared objects for distribution back to each client device, the mechanisms described herein provide seamless real-time gesture rendering. Without the distributed computing environment and interaction of the local and cloud-based components of the described infrastructure latency issues associated with cursor interactions would make gesture operations in association with shared objects choppy and cumbersome. Thus, by only logging and reporting operational changes made by client devices to or associated with shared objects (e.g., distributed data structures corresponding to shared objects) on the server and merging those operational changes at each client device associated with the shared object rather than on the server, the described infrastructure is extremely light weight and provides a collaborative experience with very little latency. The decreased latency provided by the distributed infrastructure described herein, wherein each client is responsible for its own state, makes it possible to accurately render and display dynamic object movement (e.g., cursor movement, gesture animation) in real-time. The ability to accurately render and display cursor movement in real-time makes rendering and displaying interactive gestures associated with shared objects a fluid experience for all parties involved and enhances and drives user collaboration in association with shared objects.

FIG. 1 is a schematic diagram illustrating an example distributed computing environment 100 for enabling real-time gestures on shared canvases. Computing environment 100 includes first local device sub-environment 102 (e.g., first local device sub-environment 102A, first local device sub-environment 102B), second local device sub-environment 117, and cloud computing sub-environment 116.

First local device sub-environment 102 includes computing device A 104 (e.g., computing device A 104A, computing device A 104B), merge logic 106 (e.g., merge logic 106A, merge logic 106B), application logic 108 (e.g., application logic 108A, application logic 108B), gesture engine 110 (e.g., gesture engine 110A, gesture engine 110B), and distributed data structure 112 (e.g., distributed data structure 112A, distributed data structure 112B). Second local device sub-environment 117 comprises second computing device B 119. Second computing device B 119 comprises merge logic 106C, application logic 108C, gesture engine 110C, and distributed data structure 112C.

Cloud computing sub-environment 116 includes network and processing sub-environment 118, shared object service 126, data store 124, and shared object 115. Network and processing sub-environment 118 includes network 120 and server computing device 122. Any and all of the computing devices described herein may communicate with one another via a network, such as network 120. Server computing device 122 is illustrative of one or more server computing devices that may store data described herein and/or perform operations described herein associated with enabling real-time gestures on shared canvases. For example, server computing device 122 may execute operations including but not limited to: receiving an indication of a movement of a cursor on a shared canvas, wherein the movement of the cursor is initiated by a first client device accessing the shared canvas; logging the movement of the cursor as an operation in a cloud-based ledger of operations associated with the shared canvas; determining that the movement of the cursor satisfies each of one or more conditions of a gesture operation; sending data specifying the operation to a second client device accessing the shared canvas; causing, using the data specifying the operation, the second client device to render the movement of the cursor on a graphical user interface representation of a distributed data structure corresponding to the shared canvas on the second client device; and causing the second client device to transform the cursor to a user interface element corresponding to the gesture operation on the graphical user interface representation of the distributed data structure corresponding to the shared canvas on the second client device. In some examples, server computing device 122 may host one or more ledgers, lists, and/or engines associated with shared object service 126.

Gesture engine 110 is illustrated as being included in each of first local device sub-environment 102A, second computing device sub-environment 117, and cloud computing sub-environment 116. This is the case because one or more operations described herein that are performed by gesture engine 110 may be performed by computing devices in one, some, or all of those sub-environments. That is, operations executed by gesture engine 110C may be performed by any of the local computing devices (e.g., computing device A 104A/104B, computing device B 119), and/or any of the cloud-based computing devices that execute instructions associated with the shared object service 126 (e.g., server computing device 122).

Shared object service 126 comprises operation ledger 128, gesture engine 110C, cursor position ledger 130, client device list 132, and network analysis engine 136. Shared object service 126 stores data and executes operations associated with enabling real-time gestures on shared canvases. Shared object service 126 may be associated with a data store (e.g., data store 124) that stores shared objects (e.g., shared object 115) that may be accessed by a plurality of local computing devices. Shared object service 126 and any of the shared objects shared object service 126 provides access to may be accessed by a local computing device via a website or an application executed by the local computing device.

Shared object 115 is illustrative of one or more shared objects, surfaces and/or canvases that may be hosted by data store 124, associated with shared object service 126, and accessed and interacted with simultaneously by one or more local computing devices (e.g., computing device A 104, computing device B 119). As described herein a shared canvas comprises a visual representation (e.g., displayed graphical user interface) of a shared object or distributed data structure. In some examples, shared object 115 may comprise a cloud-based productivity application or service document. Examples of productivity applications/services include but are not limited to word processing applications/services, spreadsheet applications/services, email applications/services, chat applications/services, meeting applications/services, presentation applications/services, drawing applications/services, task applications/services, to-do applications/services, and note taking applications/services, among others. In additional examples, shared object 115 may comprise a shared component, a shared page, and/or a shared workspace. As described herein a shared component may comprise one or more shared text strings, one or more shared lists, one or more shared polls, one or more shared tables, and/or one or more shared images, for example, As described herein a shared page may comprise a shared surface (e.g., a canvas, an application, a webpage) that includes one or more shared components. As described herein a shared workspace may comprise a surface (e.g., a canvas, an application, a webpage) that includes one or more shared pages. A shared workspace may include one or more organization panes and/or settings elements for navigating a workspace and modifying various elements associated with a workspace.

A user account that creates a shared object associated with shared object service 126 may provide one or more other user accounts (e.g., secondary user accounts) with access to the shared object via settings associated with the shared object or shared object service 126. One or more unique identifiers associated with devices and/or user accounts that have been granted with access to a shared object may be stored in a list hosted by shared object service 126. In the illustrated example this is illustrated by client device list 132. The shared object service 126 may use client device list 132 to communicate with the various user accounts and devices that are associated with shared documents. The shared object service and the client devices associated with the shared object service may communicate with one another via Uniform Resource Identifiers, Uniform Resource Locators, other unique identifying methodologies, and/or one or more application programming interfaces.

In some examples, once a secondary user account (e.g., on a client device) accesses a shared object that has been shared with it by shared object service 126 (e.g., via a link, via a component embedding in an application or service surface/canvas), the client computing device that the shared object is accessed from may generate a distributed data structure (e.g., distributed data structure 112) corresponding to the shared object. A distributed data structure (e.g., distributed data structure 112) is a local representation of a shared object (e.g., shared object 115). The distributed data structure may be modified by the local device that hosts it based on operations associated with the shared object that are reported to the local device. For example, if computing device A 104A hosts distributed data structure 112A, which is a local representation of shared object 115, computing device B 119 hosts distributed data structure 112C and makes a change associated with distributed data structure 112C, the operations associated with that change may be reported to shared object service 126. Shared object service 126 may log one or more operations associated with the change (e.g., in operation ledger 128, in cursor position ledger 130) along with an operation execution time, report the one or more operations associated with the change to computing device A 104A, and computing device A 104A may modify distributed data structure 112A accordingly, rather than having to merge all operations directly to the object itself (e.g., shared object 115 in cloud computing sub-environment 116). A graphical representation of the distributed data structure (e.g., distributed data structure 112A) may then be rendered by the local/client computing device (e.g., computing device A 104A). The changes to each distributed data structure 112 may be persisted to the shared object 115 according to times, intervals, and/or triggering events provided by settings associated with shared object service 126 or shared object 115, or based on receiving a manual input from one or more client devices to persist changes to shared object 115.

As described above, shared object service 126 receives indications of operations performed by client devices on or associated with shared objects. Examples of operations that may be performed by a client device on a shared object, and which may be reported to shared object service 126 for storing in operation ledger 128 include create operations, update operations, and delete operations. Similarly, cursor position operations performed in association with a shared object by a local device may be reported by the local device to the shared object service, and the shared object service may write and store those operations to cursor position ledger 130 along with cursor position movement times. The cursor position operations that may be reported and stored in cursor position ledger 130 may comprise direction of cursor movement on a GUI, angle of cursor movement on a GUI, distance of cursor movement on a GUI, speed of cursor movement on a GUI, velocity of cursor movement on a GUI, and/or acceleration of cursor movement on a GUI. Although in this example cursor position ledger 130 is illustrated as being a separate ledger from operation ledger 128, in other examples cursor position ledger 130 may be incorporated as part of operation ledger 128.

As operations associated with shared objects are received from local/client computing devices by shared object service 126, those operations are written to one or both of operation ledger 128 and cursor position ledger 130, associated (e.g., with metadata, in a table) with a timestamp of when each operation was performed, and reported to each local computing device that is associated with the shared object, or has an active copy of a corresponding distributed data structure open. Merge logic (e.g., merge logic 106) on the local computing devices then determines in which order to execute the operations and therefore modify the distributed data structure (e.g., distributed data structure 112). Merge logic 106 and/or the form of distributed data structure 112 may dictate that cursor position operations are optimistic operations that require a last-writer-wins merge policy. Thus, the local devices are expected to receive and process operations in whatever order they are received based on the timestamps included in operation ledger 128 and/or cursor position ledger 130, converging on a common state. Application logic 108 may perform operations in tandem with merge logic 106 for managing state information associated with distributed data structures and reflecting user edits and operations associated with shared objects.

By only logging and reporting operational changes made by client devices to or associated with shared objects (e.g., distributed data structures corresponding to shared objects) on the server and merging those operational changes at each client device associated with the shared object rather than on the server, the described infrastructure is extremely light weight and provides a collaborative experience with very little latency. The decreased latency provided by the distributed infrastructure described herein, where each client is responsible for its own state, makes it possible to accurately render and display dynamic object movement (e.g., cursor movement, gesture animation) in real-time. The ability to accurately render and display cursor movement in real-time makes rendering and displaying interactive gestures associated with shared objects a fluid experience for all parties involved as more fully described below.

Gesture engine 110 includes a plurality of rules for initiating a transformation of a cursor displayed on a graphical user interface representation of a distributed data structure corresponding to a shared object/canvas to one or more gestures or gesture animations. Examples of gestures or gesture animations that gesture engine 110 may include rules/conditions for include handshakes, high fives, fist bumps, and waves, among others (e.g., wand waves, mug/glass cheers). Each of the gestures or gesture animations may be associated with one or more rules/conditions for transforming a cursor into the corresponding gesture/animation. The one or more rules may be associated with cursor position relative to one or more other cursors on a shared canvas, speed of cursor movement, velocity of cursor movement, acceleration of cursor movement, distance on a GUI of cursor movement, direction of cursor movement on a GUI, and/or angle of cursor movement on a GUI. In some examples, one or more buttons (e.g., left mouse button, right mouse button, left touchpad input, right touchpad input, space bar, shift button) may have to be received in addition or alternatively to a cursor movement for gesture conditions to be fulfilled for a specific gesture/animation type. For example, to initiate a fist bump a first cursor may have to be moved to within a threshold distance from a second cursor, and a left or right mouse click or other button input may have to be received to initiate the transformation of the cursor to the fist bump gesture/animation.

In examples where gesture engine 110 resides on a client device that moved a cursor on a GUI of a shared object/canvas that is determined to meet conditions for a gesture/animation, the determination of the conditions being fulfilled, or the transformation of the cursor to the gesture/animation, may be reported to and logged by shared object service 126. That determination or transformation operation may then be reported to one or more secondary client devices that are accessing the shared object/canvas, and the secondary client devices may modify their distributed data structures accordingly and/or render the gesture/animation accordingly based on the operational reporting by shared object service 126.

In examples where gesture engine 110 resides in the cloud (e.g., gesture engine 110C in shared object service 126), the gesture engine 110C may receive operational movements of a cursor on a GUI of a shared object/canvas from a first client device accessing the shared object/canvas, determine whether one or more conditions of a gesture/animation are met, and log that determination as an operation. The operation may then be reported out to any secondary client devices that are accessing the shared object/canvas, and the secondary client devices may modify their distributed data structures accordingly and/or render the gesture/animation accordingly based on the operational reporting by shared object service 126.

In examples where gesture engine 110 resides on a secondary client device (e.g., a client device that did not move the cursor), the primary client device (e.g., the client device that moved the cursor on a GUI of a shared object/canvas) may send those cursor movement operations to the shared object service 126. Shared object service 126 may then notify the secondary client device of the cursor movement operations, and the gesture engine on the secondary client device may make a determination of whether the cursor movement operations meet conditions for a gesture/animation. If a determination is made by the secondary client device and its gesture engine that the cursor movement operations meet conditions for a gesture/animation, the secondary client device may modify its distributed data structure accordingly and/or render the gesture/animation accordingly.

In this example computing device A 104A and computing device B 119 are displaying a GUI representation of shared object 115. That is, computing device A 104A displays shared canvas 114A, which is a representation of distributed data structure 112A. Distributed data structure 112A provides a local representation of shared object 115 and merges operational changes reported by shared object service 126 to distributed data structure 112A. Computing device B 117 also displays (although not shown for ease of illustration), a GUI representation of shared object 115. That is, computing device B 117 displays a representation of distributed data structure 112C. Distributed data structure 112C provides a local representation of shared object 115 and merges operational changes reported by shared object service 126 to distributed data structure 112C. In this example, computing device A 104A is associated with a first user account (e.g., "user A") and that user account has a cursor 103 rendered for it on shared canvas 114A. Cursor 103 is displayed proximate to an indication of the identity of the user account (e.g., "user A") associated with it. Computing device B 119 is associated with a second user account (e.g., "user B") and that user account has a cursor 105 rendered for it on shared canvas 114A. One or both of cursors 103 and 105 may be rendered on shared canvas 114A based on their positions and movement operations being reported to shared object service 126, and shared object service 126 reporting those positions and movement operations back to each distributed data structure 112. Cursor 105 is also displayed proximate to an indication of the identity of the user account (e.g., "user B") associated with it.

Shared canvas 114A further displays user icons for each user account that is currently accessing a data structure corresponding to shared object 115. Thus, in this example, a first user icon corresponding to user A (and computing device A 104) is displayed next to a second user icon corresponding to user B (and computing device B 119) in the upper right corner of shared canvas 114.

In this example cursor 103 is moved from a first position to a second position on shared canvas 114A by computing device A 104A. Similarly, cursor 105 is moved from a first position on a shared canvas displayed by computing device B 119 by computing device B 119. The cursor movement operations are sent to shared object service 126, which may log those operations in operation ledger 128 and/or cursor position ledger 130 in association with a time of cursor operation execution. The cursor movement operations and time of execution (or an order of execution) are then provided by shared object service to each client device (e.g., computing device A 104A, computing device B 119), and merged in each corresponding distributed data structure 112 for rendering on each shared canvas. In this example, gesture engine 110 makes a determination that the cursor movement operations for each of cursors 103 and 105 satisfy each of one or more conditions of a gesture operation. The gesture operation for both cursors corresponds to a high five gesture. As such, gesture engine 110 causes cursor 103 to be transformed to high five user interface element 107 and cursor 105 to be transformed to high five user interface element 109, as illustrated on shared canvas 114B.

In some examples, shared object service 126 may make a determination that cursors and gestures should not be rendered in real or near real-time on shared canvases. For example, network analysis engine 136 may monitor network parameters and determine based on one or more of those parameters that network conditions are below a threshold value. If a determination is made that the network conditions are below the threshold value, the shared object service 126 may no longer render cursor position for secondary client devices on a shared surface/canvas. Examples of network parameters network analysis engine 136 may monitor include network mode, bandwidth, packet loss, latency, and jitter. By disabling real-time cursor movement in shared canvases when network conditions are poor the shared object service reduces processing costs associated with collaborative user experiences when they would not be served by the gesture operations described herein.

Figure 2:
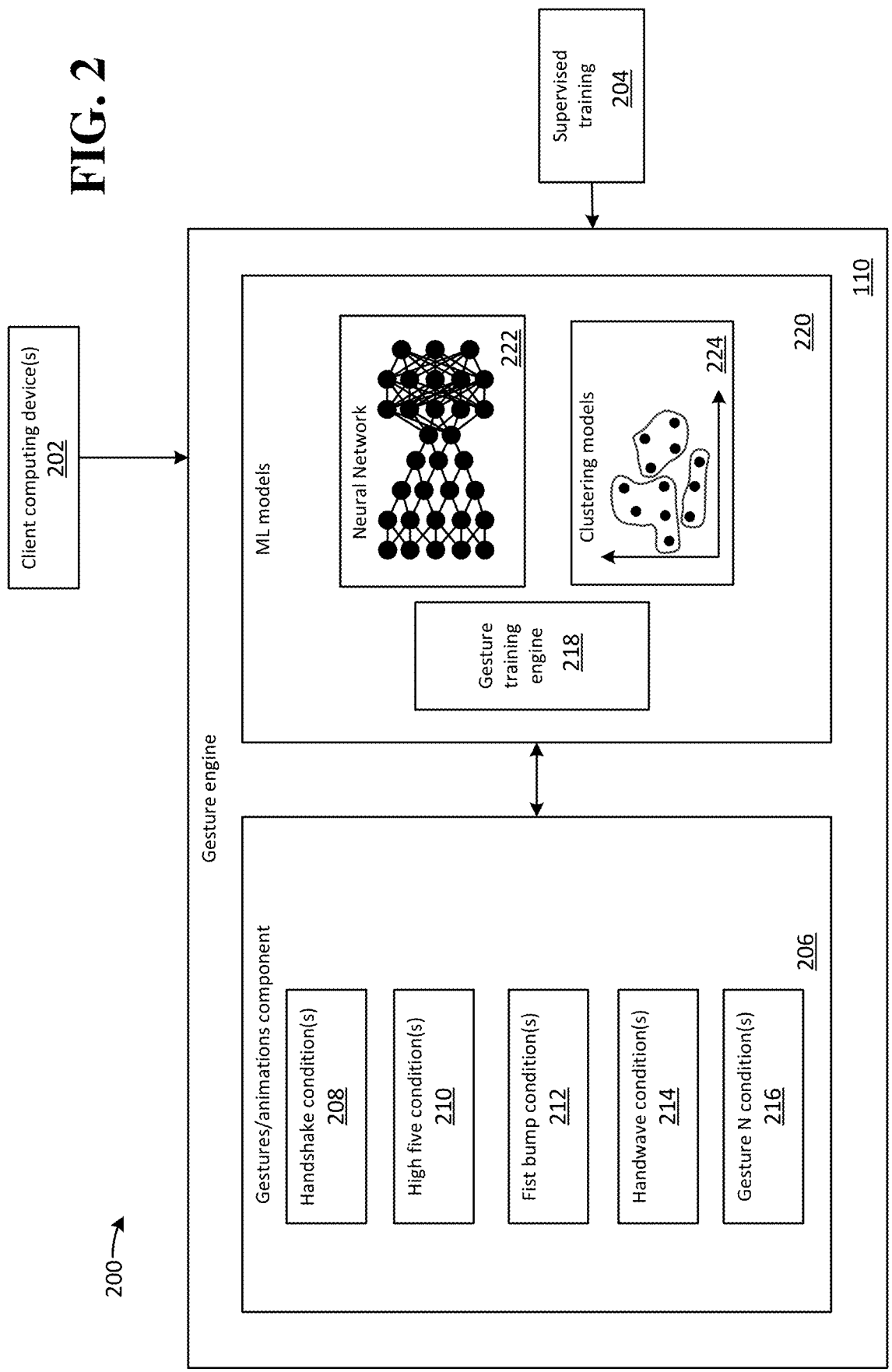
FIG. 2 illustrates an exemplary block diagram of a gesture engine utilized for enabling real-time gestures on shared canvases.

FIG. 2 illustrates an exemplary block diagram 200 of a gesture engine 110 utilized for enabling real-time gestures on shared canvases. Gesture engine 110 includes gestures/animations component 206 and machine learning models 220. Block diagram 200 further includes client computing device(s) 202 and supervised training element 204.

Gestures/animations component 206 includes the identities of a plurality of gestures/animations that cursors may be transformed into, as well as conditions associated with the transformation to each of those gestures/animations. Specifically, gestures/animations component 206 includes hand-shake condition(s) 208, high five condition(s) 210, fist bump condition(s) 212, handwave condition(s) 214, and gesture N condition(s) 216. Gesture N condition(s) 216 is representative of conditions for one or more other gestures/animations that may be included in gestures/animations component, such as glass/mug cheers, magic wand waving, etc. The conditions for the gestures/animations included in gestures/animations component 206 may require a specific (or within threshold value of) direction of cursor movement on a GUI, a specific (or within threshold value of) angle of cursor movement on a GUI, a specific (or within threshold value of) distance of cursor movement on a GUI, a specific (or within threshold value of) speed of cursor movement on a GUI, a specific (or within threshold value of) velocity of cursor movement on a GUI, a specific (or within threshold value of) acceleration of cursor movement on a GUI, a specific (or within threshold value of) distance from one or more other cursors, a specific secondary input (e.g., mouse button input, keyboard input, touchpad input), or a combination of any of the same prior to being met such that a transformation of a cursor to a corresponding gesture/animation may be initiated.

Machine learning models 220 include neural network 222, clustering models 224, and gesture training engine 218. Thus, gesture engine 110 may comprise one or more machine learning models that have been trained to identify whether users intend to transform a cursor into one or more gestures/animations based on received cursor inputs (e.g., from client computing device(s) 202) and user feedback related to those user inputs. For example, if gesture engine 110 determines that a cursor input from a client computing device fulfills conditions for a specific gesture/animation and therefore the cursor is transformed from a cursor to the specific gesture/animation, the shared object service 126 may query the user for feedback that as to whether the transformation was appropriate or inappropriate. Alternatively, if gesture engine 110 determines that a cursor input from a client computing device does not fulfill conditions for a specific gesture/animation and therefore the cursor is not transformed from a cursor to one or more gesture/animations, the user may provide manual input to transform the cursor based on similar movements in the future if the user felt that the gesture should have been recognized by the shared object service. Thus, neural network 222 may receive cursor movement operations and generate outputs that correspond to a likelihood that a user intends for those cursor movements to correspond to a gesture/animation. The user feedback (positive or negative) may be utilized to train neural network 222 to more closely align with user intent, and gesture training engine 218 may provide updated gesture conditions from that training to gestures/animations component 206.

Similarly, clustering models 224 may receive cursor movement operations and cluster/associate those operations with one or more gesture/animation types. If positive or negative feedback is received, clustering models 224 may modify one or more corresponding datapoints in clustering models 224 accordingly.

Machine learning models 204 may also be trained via supervised training, as illustrated by supervised training element 204. For example, administrative and/or developer users may input one or more cursor inputs and manually associate those inputs with one or more gestures/animations. One or more machine learning models 220 may be trained to identify cursor input characteristics and/or thresholds that should be saved as gesture/animation conditions for those manually associated gestures/animations. In this manner, rather than having to manually set cursor speed, distance, angle, velocity, etc. characteristics and associate them as conditions of gestures/animations, users may efficiently create and/or update conditions for new and existing gestures/animations via a simplistic machine learning training process. Of course, the administrative/developer users, and in some cases downstream users, may manually adjust the gesture/animation conditions (e.g., via settings associated with the shared object service 126).

Figure 3:
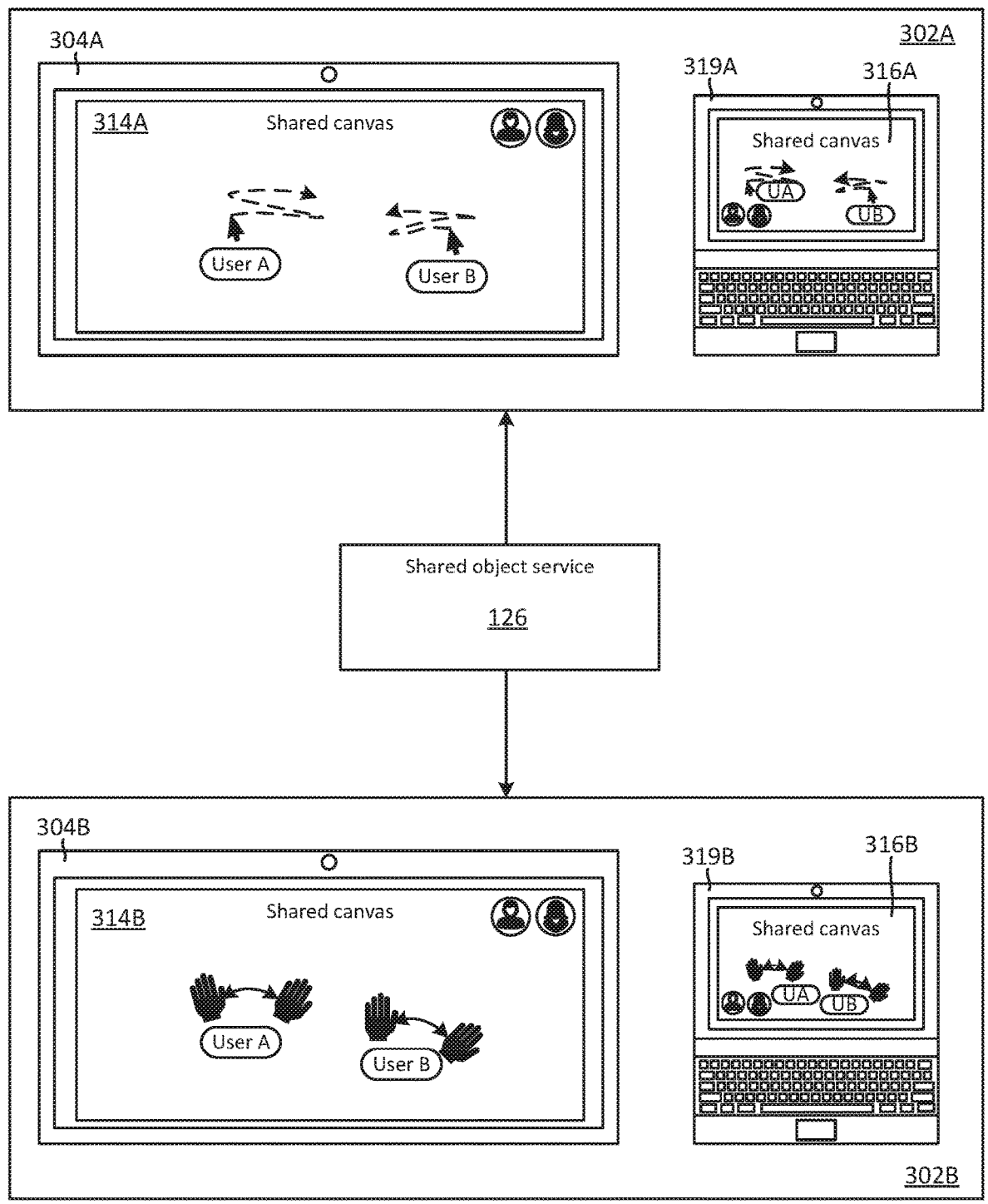
FIG. 3 illustrates multiple computing devices and user interfaces associated with a shared object service for enabling a real-time hand wave gesture.

FIG. 3 illustrates multiple computing devices (e.g., client computing device 304, client computing device 319) and user interfaces associated with a shared object service 126 for enabling a real-time handwave gesture. FIG. 3 includes real-time cursor rendering environment 302A and real-time gesture environment 302B in which the cursors in real-time cursor rendering environment 302A have been transformed to gestures/animations based on a determination that movements of the cursors satisfy each of one or more conditions of a gesture operation.

Client computing device 304A displays shared canvas 314A, which is a visual representation of a shared object associated with shared object service 126. Shared canvas 314A is rendered by computing device 304A by processing a locally stored distributed data structure corresponding to the shared object. Client computing device 319A displays shared canvas 316A, which is a visual representation of the same shared object associated with shared object service 126. Shared canvas 316A is rendered by computing device 319A by processing a locally stored distributed data structure corresponding to the shared object. Thus, computing device 304 and computing device 319 are both accessing and interacting with the same shared object via a low latency distributed infrastructure of the shared object service 126 and local copies of a distributed data structure corresponding to the shared object.

Shared canvas 314 and shared canvas 316 include user icons of each user that is currently accessing the shared object. A user input device (e.g., a mouse, a touchpad) connected to computing device 304A is utilized to move the cursor on the left portion of shared canvas 314A in a zigzag pattern as illustrated by the cursor with the user identifier "user A" next to it. The "user A" cursor movement may be sent to the shared object service 126 and added to operation ledger 128 and/or cursor position ledger 130 where the cursor movement operation(s) may be associated with timestamps of when the operation(s) occurred/were executed. Shared object service 126 may then send that operation data to each connected device (e.g., client computing device 304, client computing device 319). The client computing devices and/or shared object service 126 may make a determination as to whether the cursor movement operations satisfy each of one or more conditions for one or more gesture operations.

In this example, a determination is made that the "user A" cursor movement operation(s) fulfill conditions for a handwave gesture/animation. As such, the distributed data structures corresponding to the shared object on client computing devices 304 and 319 may be modified. Based on the modification, the "user A" cursor may be transformed to a handwave gesture/animation as illustrated on shared canvas 314B and shared canvas 319B.

A user input device (e.g., a mouse, a touchpad) connected to computing device 319A is utilized to move the cursor on the right portion of shared canvas 316A in a zigzag pattern as illustrated by the cursor with the user identifier "user B" next to it. The "user B" cursor movement may be sent to the shared object service 126 and added to operation ledger 128 and/or cursor position ledger 130 where the cursor movement operation(s) may be associated with timestamps of when the operation(s) occurred. Shared object service 126 may then send that operation data to each connected device (e.g., client computing device 304, client computing device 319). The client computing devices and/or shared object service 126 may make a determination as to whether the cursor movement operations satisfy each of one or more conditions for one or more gesture operations.

In this example, a determination is made that the "user B" cursor movement operation(s) fulfill conditions for a handwave gesture/animation. As such, the distributed data structures corresponding to the shared object on client computing devices 304 and 319 may be modified. Based on the modification, the "user B" cursor may be transformed to a handwave gesture/animation as illustrated on shared canvas 314B and shared canvas 319B.

In some examples, when an indication of one or more cursor movement operations are received by a client computing device (e.g., from shared object service 126), the distributed data structure for the shared object on that client computing device need not necessarily be modified. Rather, the position of the corresponding cursor may simply be rendered in real-time to reflect the updated positioning and cursor movement path. The same is true for transformation of the cursor to a gesture/animation.

Figure 4:
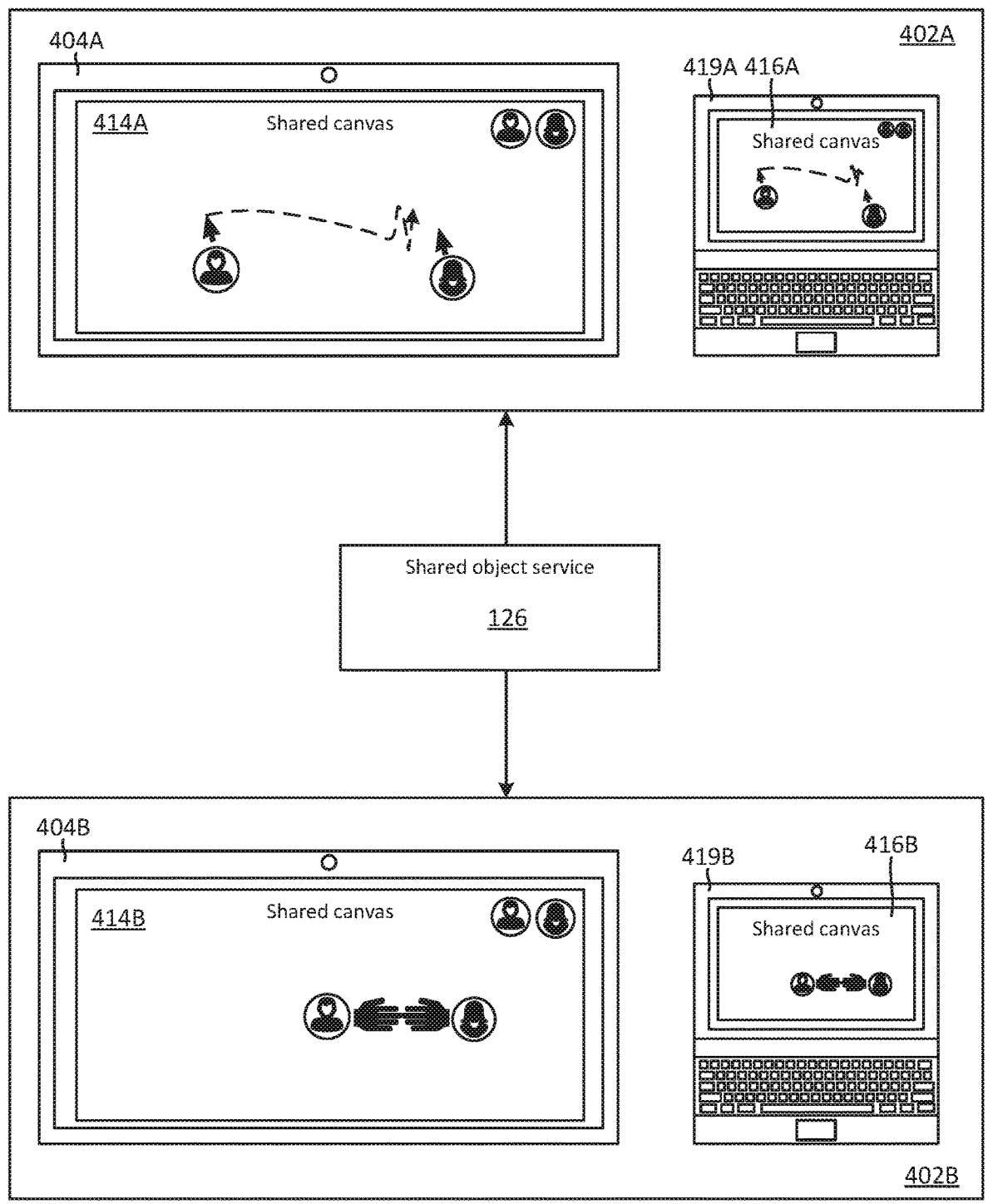
FIG. 4 illustrates multiple computing devices and user interfaces associated with a shared object service for enabling a real-time handshake gesture.

FIG. 4 illustrates multiple computing devices (e.g., client computing device 404, client computing device 419) and user interfaces associated with a shared object service 126 for enabling a real-time handshake gesture. FIG. 4 includes real-time cursor rendering environment 402A and real-time gesture environment 402B in which the cursors in real-time cursor rendering environment 402A have been transformed to gestures/animations based on a determination that movements of one or more of the cursors satisfy each of one or more conditions of a gesture operation.

Client computing device 404A displays shared canvas 314A, which is a visual representation of a shared object associated with shared object service 126. Shared canvas 414A is rendered by computing device 404A by processing a locally stored distributed data structure corresponding to the shared object. Client computing device 419A displayed shared canvas 416A, which is a visual representation of the same shared object associated with shared object service 126. Shared canvas 416A is rendered by computing device 419A by processing a locally stored distributed data structure corresponding to the shared object. Thus, computing device 404 and computing device 419 are both accessing and interacting with the same shared object via a low latency distributed infrastructure of the shared object service 126 and local copies of a distributed data structure corresponding to the shared object.

In this example, the users of client computing device 404 and client computing device 419 are communicating via an electronic video/meeting application or service. As such, rather than simply including a user identifier (e.g., name, alias) next to their cursors, each cursor on shared canvas 314/416 is displayed next to a live video feed of a corresponding user (e.g., based on a video feed from a camera connected to each computing device). The video feed for each user may move with the corresponding user's cursor such that when a user interacts with a particular portion of a shared workspace, page, or component, the user's video feed follows that cursor's position.

In this example, a user input device (e.g., a mouse, a touchpad) connected to computing device 404A is utilized to move the cursor on the left portion of shared canvas 314A next to the cursor on the right portion of shared canvas 314A and subsequently in an up and down pattern. The cursor movement may be sent to the shared object service 126 and added to operation ledger 128 and/or cursor position ledger 130 where the cursor movement operation(s) may be associated with timestamps of when the operation(s) occurred. Shared object service 126 may then send that operation data to each connected device (e.g., client computing device 404, client computing device 419). The client computing devices and/or shared object service 126 may make a determination as to whether the cursor movements satisfy each of one or more conditions for one or more gesture operations.

In this example, a determination is made that the left cursor movement operation(s) fulfill conditions for a handshake gesture/animation. As such, the distributed data structures corresponding to the shared object on client computing devices 404 and 419 may be modified. Based on the modification, the cursor on the left may be transformed to a handshake gesture/animation as illustrated on shared canvas 414B and shared canvas 419B.

In this example, a determination is also made that, although the cursor on the right has not moved, the left cursor movement operations automatically satisfy each of one or more conditions for the right cursor to be transformed to a handshake gesture/animation. For example, conditions for the right cursor to transform to a handshake gesture/animation may include that a second cursor be within a threshold proximity to the right cursor and that the second cursor transform into a handshake gesture/animation. Thus, in some examples, a cursor need not necessarily move to satisfy gesture/animation conditions.

In this example, a determination is made that operations associated with cursor movements sent from shared object service 126 to client computing device 419 satisfy handshake gesture/animation conditions for the right cursor on shared canvas 414/416. As such, the distributed data structures of client computing devices 404 and 419 may be modified and the right cursor may also be transformed to a handwave gesture animation as illustrated on shared canvas 414B and shared canvas 416B. Although in this example no movement operations of the right cursor were necessary to initiate the transformation of that cursor to a gesture/animation, in other examples one or more movement operations of a cursor may be necessary to initiate the transformation of the cursor to a gesture/animation.

In some examples, when an indication of one or more cursor movement operations are received by a client computing device (e.g., from shared object service 126), the distributed data structure for the shared object on the client computing device need not necessarily be modified. Rather, the position of the corresponding cursor may simply be rendered in real-time to reflect the updated positioning and cursor movement path. The same is true for transformation of the cursor to a gesture/animation.

Figure 5:
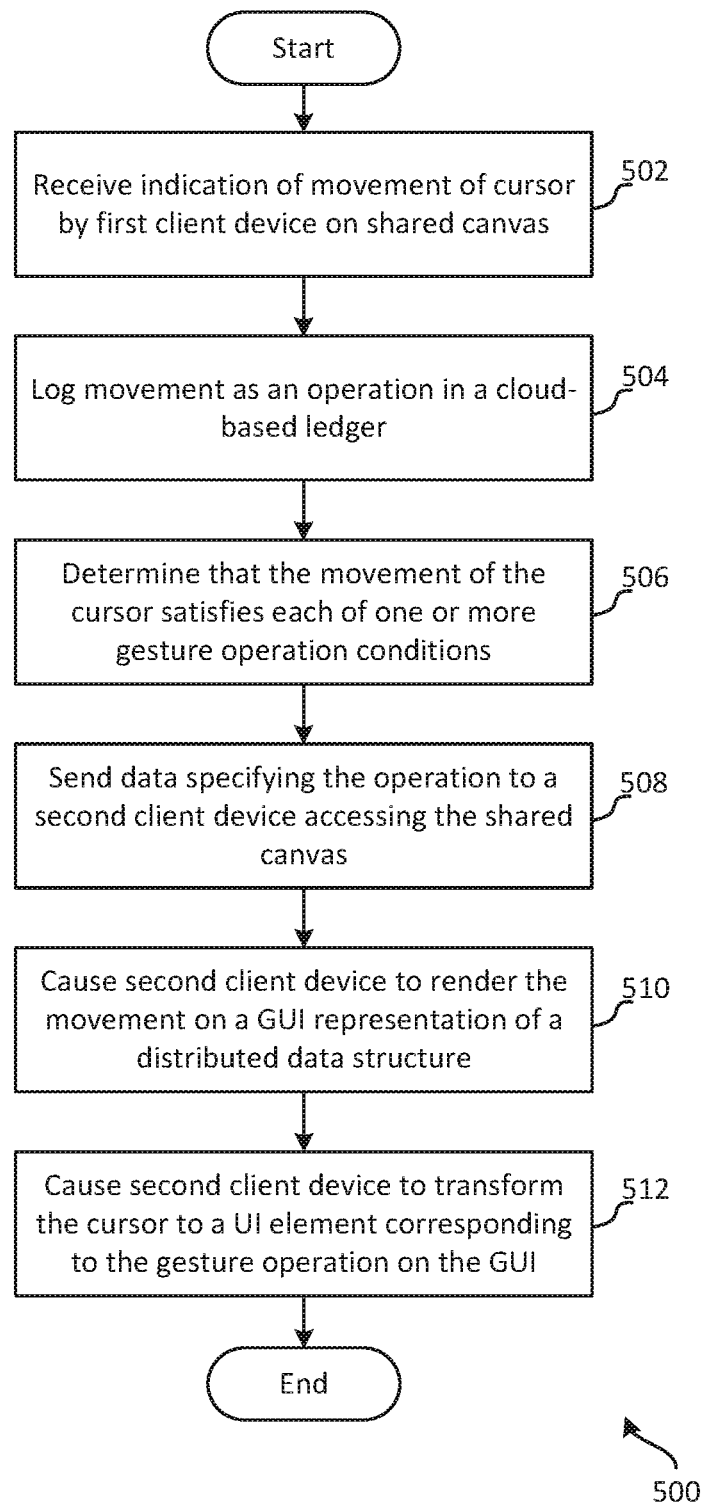
FIG. 5 is an exemplary method for enabling real-time gestures on shared canvases.

FIG. 5 is an exemplary method 500 for enabling real-time gestures on shared canvases. The method 500 begins at a start operation and the method moves to operation 502.

At operation 502 an indication of a movement of a cursor on a shared canvas is received. The movement of the cursor is initiated by a first client device accessing the shared canvas. The shared canvas may be rendered by the first computing device based on processing a distributed data structure corresponding to a shared object associated with the shared object service 126. The shared canvas may comprise a shared workspace. In some examples the shared workspace may comprise one or more shared pages. Each of the shared pages may comprise at least one shared component. In other examples, the shared canvas may not comprise a shared workspace. Rather, the shared canvas may comprise one or more shared pages or shared documents. In still other examples, the shared canvas may not comprise a shared page or a shared document. Rather, the shared canvas may comprise one or more shared components. The one or more shared components may be embedded or otherwise included in one or more applications or services (e.g., web browser application/service, electronic meeting application/service, to-do list application/service). The movement of the cursor may be initiated via movement of or on a user input device (e.g., mouse, touchpad). The distributed data structure may comprise or be associated with merge logic that requires optimistic incorporation of reported operations (e.g., last-writer-wins merge logic). In some examples, the cursor may be rendered in association with a live video feed from the first client device and the live video feed may follow the position of the cursor. This may be the case where the first client device is connected to one or more second client devices via a video conference application or service/meeting application or service.

From operation 502 flow continues to operation 504 where the movement of the cursor is logged as an operation in a cloud-based ledger of operations associated with the shared canvas. For example, the movement may be logged in operation ledger 128 and/or cursor position ledger 130. The logging may comprise associating each cursor operation (e.g., cursor movement, left click input, right click input) with a timestamp corresponding to a time that the operation was executed and/or received.

From operation 504 flow continues to operation 506 where a determination is made that the movement of the cursor satisfies each of one or more conditions of a gesture operation. In examples, determining that the movement of the cursor satisfies each of one or more conditions of a gesture operation may comprise monitoring a position of the cursor, calculating a velocity of the cursor, and/or calculating an acceleration of the cursor. The one or more conditions may require a specific (or within threshold value of) direction of cursor movement on a GUI, a specific (or within threshold value of) angle of cursor movement on a GUI, a specific (or within threshold value of) distance of cursor movement on a GUI, a specific (or within threshold value of) speed of cursor movement on a GUI, a specific (or within threshold value of) velocity of cursor movement on a GUI, a specific (or within threshold value of) acceleration of cursor movement on a GUI, a specific (or within threshold value of) distance from one or more other cursors, a specific secondary input (e.g., mouse button input, keyboard input, touchpad input), or a combination of any of the same prior to being met such that a transformation of a cursor to a corresponding gesture/animation may be initiated. The determination of whether a movement of a cursor satisfies each of one or more conditions of a gesture operation may be made by a gesture engine (e.g., gesture engine 110) residing on one or more client computing devices that are connected to the shared canvas and/or that have the shared canvas open. The determination may additionally or alternatively be made by a gesture engine of the shared object service 126 (e.g., gesture engine 110C).

From operation 506 flow continues to operation 508 where data specifying the operation is sent to a second client device accessing the shared canvas. The data may also include the timestamp information associated with the operation. The data specifying the operation may be processed by the second client computing device and the distributed data structure may be modified accordingly. In other examples, rather than modifying the distributed data structure the second client computing device may simply render the movement of the cursor on the GUI representation of the distributed data structure corresponding to the shared canvas.

From operation 508 flow continues to operation 510 where the second client device is caused to render the movement of the cursor on a GUI representation of a distributed data structure corresponding to the shared canvas on the second client device using the data specifying the operation. The movement may be rendered in real or near real-time due to the low latency and performance provided by the distributed infrastructure of the shared object service 126 and local copies of the distributed data structure corresponding to the shared object.

In some examples, prior to causing the second client device to render the movement of the cursor on the GUI, a determination may be made as to whether network conditions meet a real-time cursor rendering metric based on one or more network parameters. The one or more network parameters may comprise one or more of: a network mode, bandwidth, packet loss, latency, and jitter.

From operation 510 flow continues to operation 512 where the second client device is caused to transform the cursor to a user interface element corresponding to the gesture operation on the GUI representation of the distributed data structure corresponding to the shared canvas on the second client device.

From operation 512 flow moves to an end operation and the method 500 ends.

Figure 6:
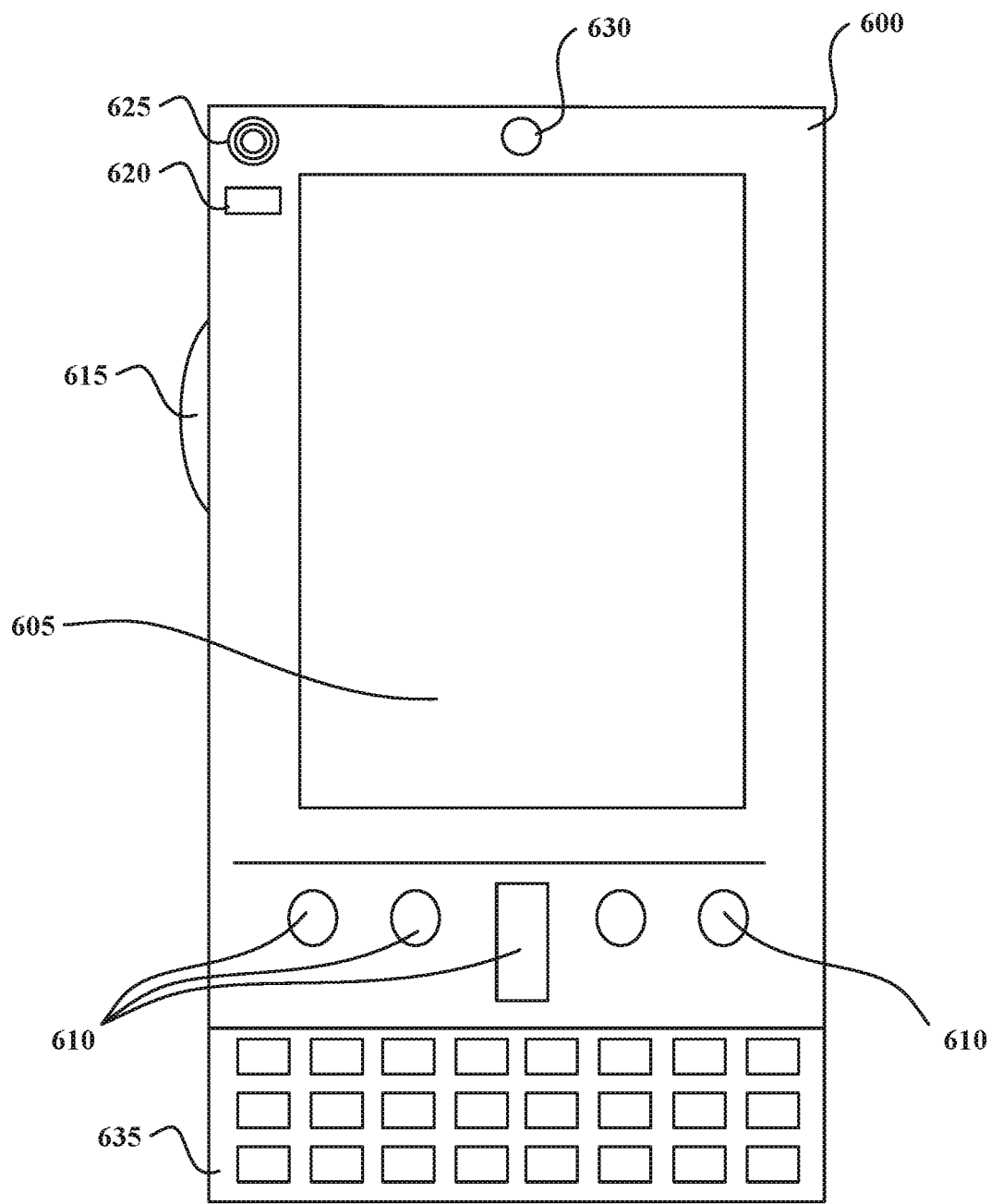
FIGS. 6 and 7 are simplified diagrams of a mobile computing device with which aspects of the disclosure may be practiced.
Figure 7:
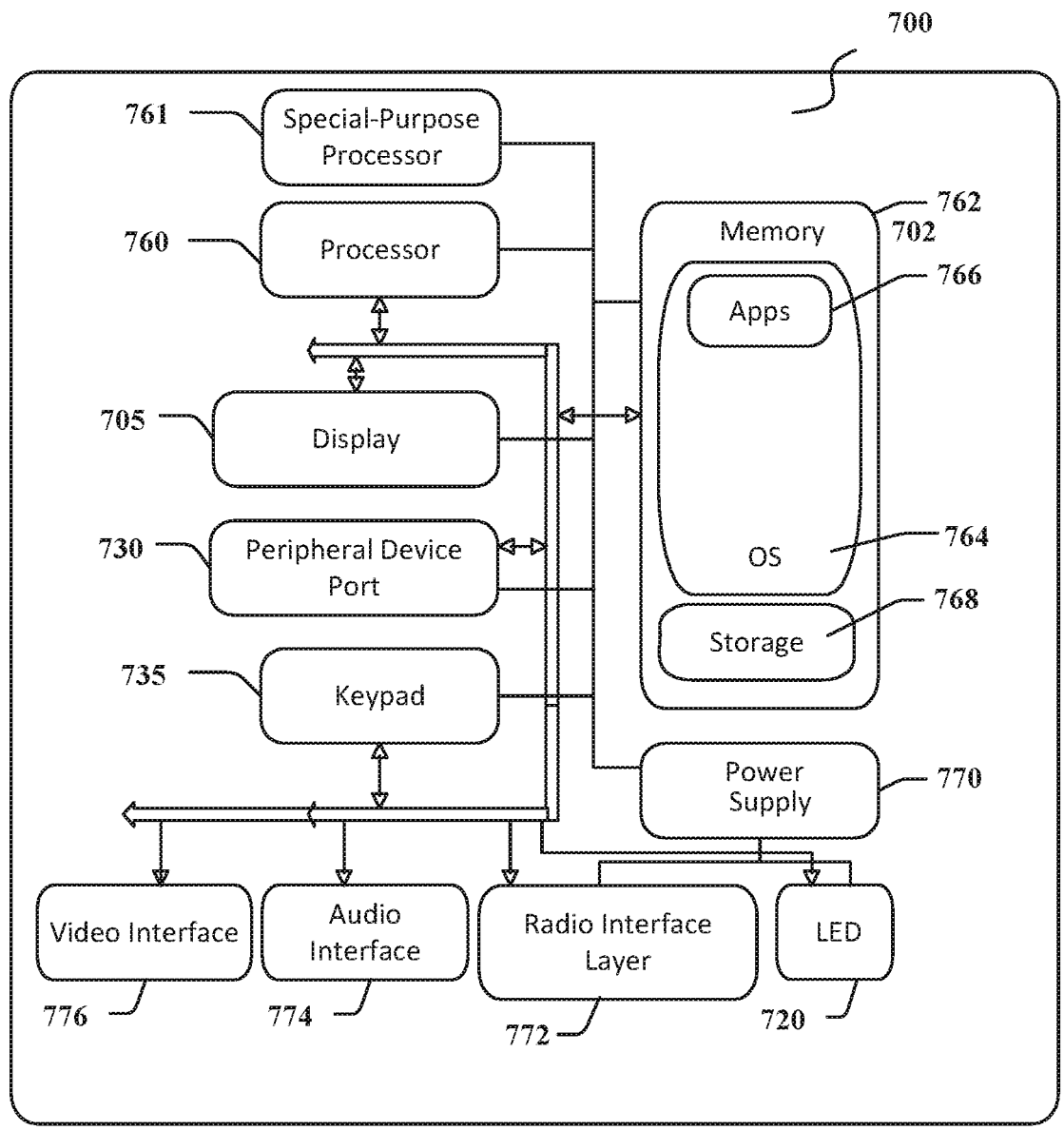

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant clustering computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
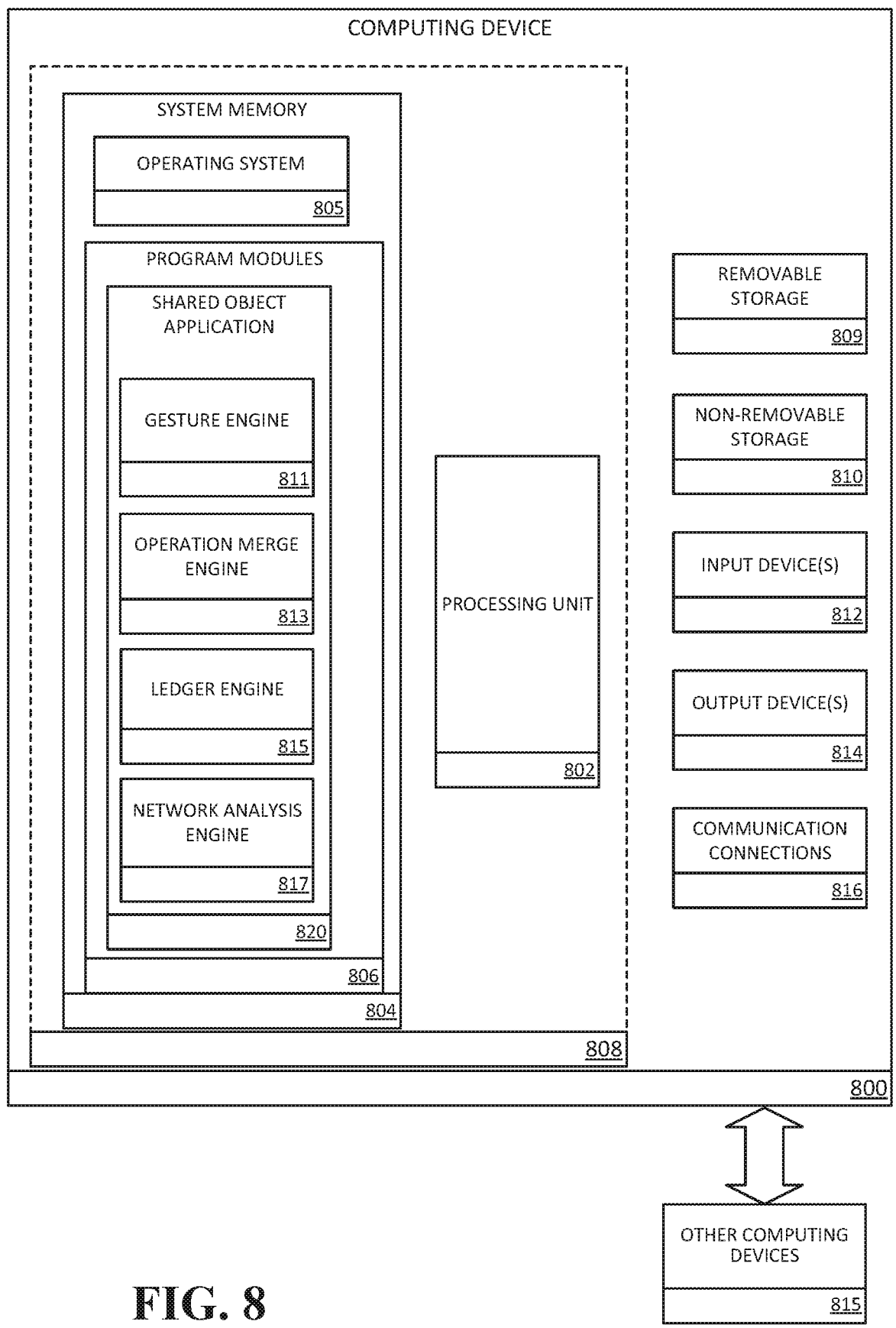
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for enabling gesture/animation operations on shared canvases. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running facial recognition and device authorization programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., shared object application 820) may perform processes including, but not limited to, the aspects, as described herein. Shared object application 820 may include a gesture engine 811, an operation merge engine 813 associated with merge logic, a ledger engine 815 associated with an operation ledger or cursor position ledger, and a network analysis engine 817.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include transitory media such as a carrier wave or other propagated or modulated data signal. Computer storage device does not include transitory media such as a carrier wave or other propagated or modulate data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
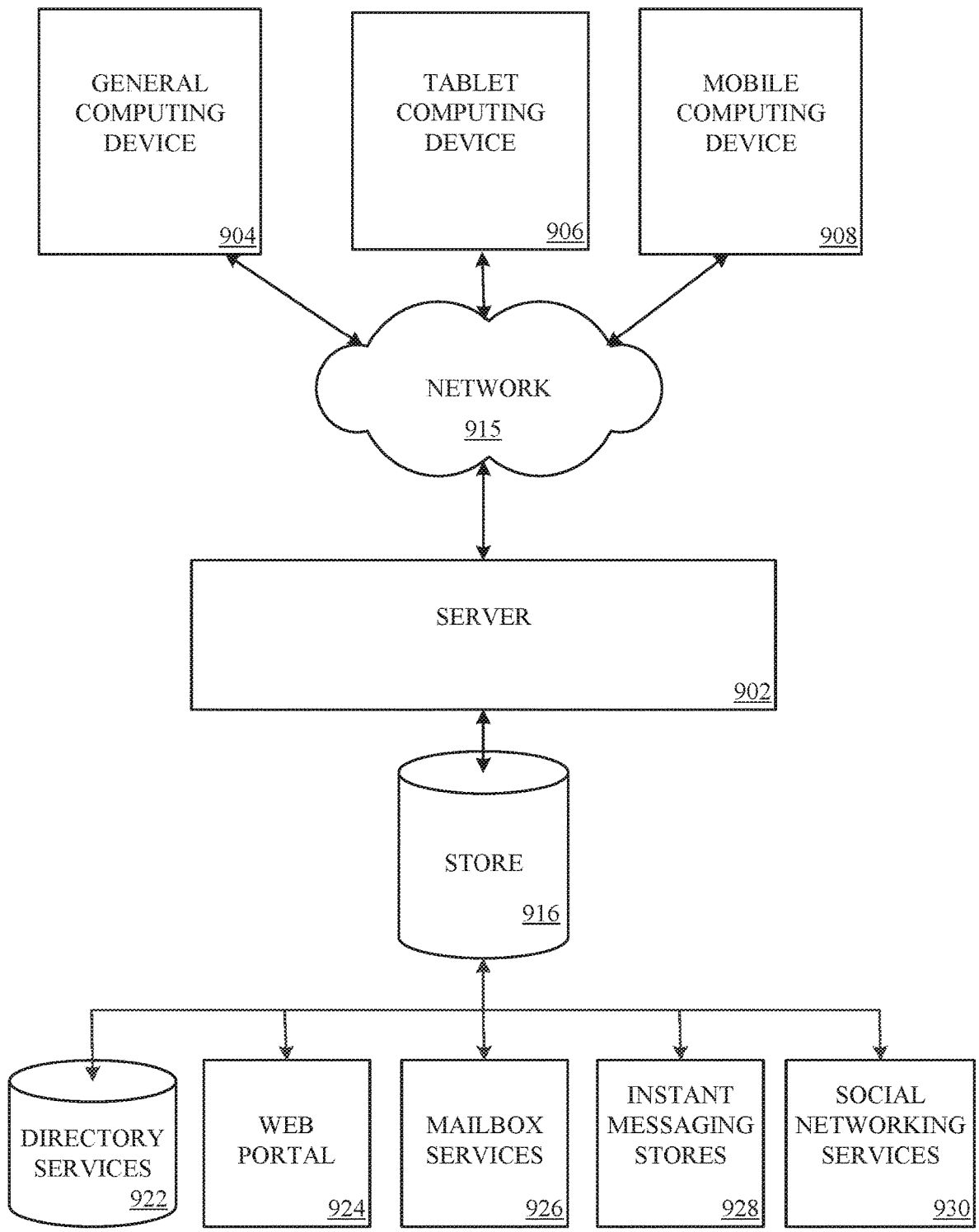
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for enabling real-time gestures on shared canvases, the computer-implemented method comprising:
   receiving, by a shared object service, an indication of a movement of a cursor on a shared canvas managed as a shared object by the shared object service, wherein the movement of the cursor is initiated by a first client device accessing the shared canvas, and wherein the first client device comprises a first distributed data structure corresponding to the shared canvas;
   logging, by the shared object service, the movement of the cursor as an operation in a cloud-based ledger of operations associated with the shared canvas;
   determining that the movement of the cursor satisfies each of one or more conditions of a gesture operation;
   sending data specifying the operation to a second client device accessing the shared canvas;
   causing, using the data specifying the operation, the second client device to render the movement of the cursor on a graphical user interface representation of a second distributed data structure stored locally on the second client device, wherein the second distributed data structure corresponds to the shared canvas, and wherein the second client device merges the operation to the second distributed data structure; and
   causing the second client device to transform the cursor to a user interface element corresponding to the gesture operation on the graphical user interface representation of the second distributed data structure corresponding to the shared canvas.

2. The computer-implemented method of claim 1, wherein the second distributed data structure corresponding to the shared canvas stored locally on the second client device comprises an optimistic data structure that utilizes a last-writer-wins merge policy.

3. The computer-implemented method of claim 1, wherein the determination that the movement of the cursor satisfies each of one or more conditions is made by the first client device.

4. The computer-implemented method of claim 1, wherein the determination that the movement of the cursor satisfies each of one or more conditions is made by the second client device.

5. The computer-implemented method of claim 1, wherein the determination that the movement of the cursor satisfies each of one or more conditions is made by a server computing device of the shared object service.

6. The computer-implemented method of claim 1, wherein:
   the shared canvas comprises a shared workspace comprising a plurality of shared pages; and
   each of the plurality of shared pages comprises at least one shared component.

7. The computer-implemented method of claim 1, further comprising:
   determining, prior to causing the second client device to render the movement of the cursor on the graphical user interface, that network conditions meet a real-time cursor rendering metric based on one or more network parameters.

8. The computer-implemented method of claim 7, wherein the one or more network parameters comprise one or more of: a network mode, bandwidth, packet loss, latency, and jitter.

9. The computer-implemented method of claim 1, wherein determining that the movement of the cursor satisfies each of one or more conditions of a gesture operation comprises:
monitoring a position of the cursor;
calculating a velocity of the cursor; and
calculating an acceleration of the cursor.

10. The computer-implemented method of claim 1, wherein:
the cursor is rendered in association with a live video feed from the first client device; and
the live video feed follows the position of the cursor.

11. A system for enabling real-time gestures on shared canvases, comprising:
a memory for storing executable program code; and
a processor, functionally coupled to the memory, the processor being responsive to computer-executable instructions contained in the program code and operative to:
receive, by a shared object service, an indication of a movement of a cursor on a shared canvas managed as a shared object by the shared object service, wherein the movement of the cursor is initiated by a first client device accessing the shared canvas and wherein the first client device comprises a first distributed data structure corresponding to the shared canvas;
log, by the shared object service, the movement of the cursor as an operation in a cloud-based ledger of operations associated with the shared canvas;
determine that the movement of the cursor satisfies each of one or more conditions of a gesture operation;
send data specifying the operation to a second client device accessing the shared canvas;
cause, using the data specifying the operation, the second client device to render the movement of the cursor on a graphical user interface representation of a second distributed data structure stored locally on the second client device, wherein the second distributed data structure corresponds to the shared canvas, and wherein the second client device merges the operation to the second distributed data structure; and
cause the second client device to transform the cursor to a user interface element corresponding to the gesture operation on the graphical user interface representation of the second distributed data structure corresponding to the shared canvas.

12. The system of claim 11, wherein the second client device applies optimistic merge logic comprising a last-writer-wins policy.

13. The system of claim 11, wherein:
the shared canvas comprises a shared workspace comprising a plurality of shared pages; and
each of the plurality of shared pages comprises at least one shared component.

14. The system of claim 11, wherein the shared canvas comprises a shared component embedded in a productivity application accessed by the first client device and the second client device.

15. The system of claim 14, wherein the productivity application comprises an electronic meeting application.

16. The system of claim 15, wherein the electronic meeting application comprises an electronic chat surface that the shared component is embedded in.

17. The system of claim 11, wherein the processor is further responsive to the computer-executable instructions contained in the program code and operative to:
receive an indication to create a new gesture;
receive a user input device input that modifies a position of the cursor in a new gesture window;
process the user input device input with a machine learning model that has been trained to identify cursor input characteristics or thresholds for new gestures; and
save the new gesture with one or more determined input characteristics or thresholds from the processing with the machine learning model.

18. The system of claim 11, wherein in determining that the movement of the cursor satisfies each of one or more conditions of a gesture operation, the processor is further responsive to the computer-executable instructions contained in the program code and operative to:
monitor a position of the cursor;
calculate a velocity of the cursor; and
calculate an acceleration of the cursor.

19. A non-transitory, computer-readable storage device comprising executable instructions that, when executed by a processor, assists with enabling real-time gestures on shared canvases, the computer-readable storage device including instructions executable by the processor for:
receiving, by a shared object service, an indication of a movement of a cursor on a shared canvas managed as a shared object by the shared object service, wherein the movement of the cursor is initiated by a first client device accessing the shared canvas, and wherein the first client device comprises a first distributed data structure corresponding to the shared canvas;
logging, by the shared object service, the movement of the cursor as an operation in a cloud-based ledger of operations associated with the shared canvas;
determining that the movement of the cursor satisfies each of one or more conditions of a gesture operation;
sending data specifying the operation to a second client device accessing the shared canvas;
causing, using the data specifying the operation, the second client device to render the movement of the cursor on a graphical user interface representation of a second distributed data structure stored locally on the second client device, wherein the second distributed data structure corresponds to the shared canvas, and wherein the second client device merges the operation to the second distributed data structure; and
causing the second client device to transform the cursor to a user interface element corresponding to the gesture operation on the graphical user interface representation of the second distributed data structure corresponding to the shared canvas.

20. The non-transitory, computer-readable storage device of claim 19, wherein:
the shared canvas comprises a shared workspace comprising a plurality of shared pages; and
each of the plurality of shared pages comprises at least one shared component.

* * * * *